Jan. 5, 1937. C. D. HOBB 2,066,729
WHEEL FOR MOTOR DRIVEN VEHICLES
Filed Oct. 24, 1935
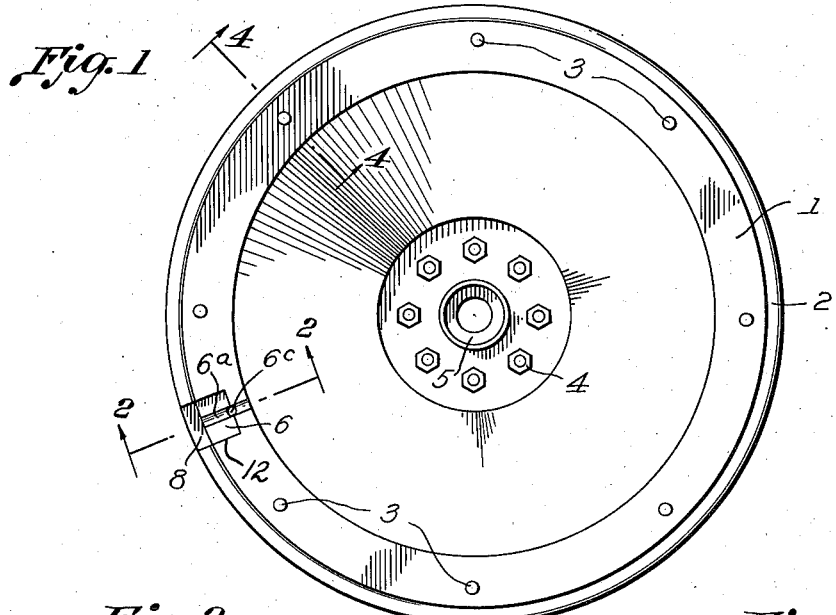
Fig. 1
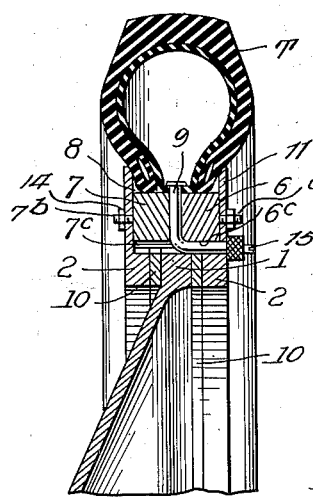
Fig. 2
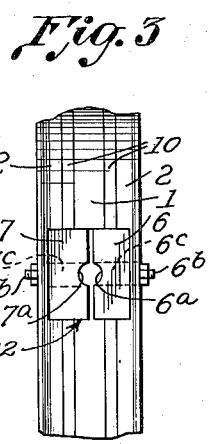
Fig. 3
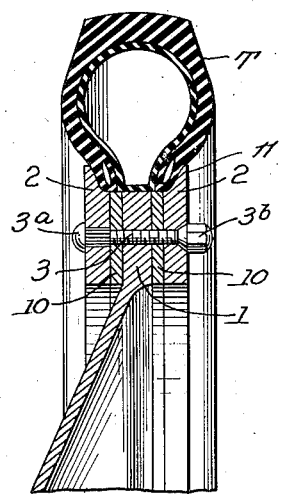
Fig. 4
Fig. 5
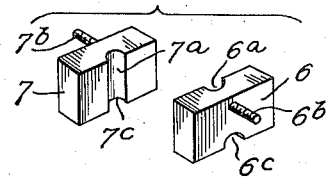
Inventor
C. D. Hobb Patented Jan. 5, 1937

2,066,729

UNITED STATES PATENT OFFICE 2,066,729

WHEEL FOR MOTOR DRIVEN VEHICLES

Coleman Dorsey Hobb, Middlesboro, Ky.

Application October 24, 1935, Serial No. 46,551

3 Claims. (Cl. 152—21)

This invention relates to vehicle wheels designed primarily for motor driven vehicles.

An object of the invention is to provide a wheel so constructed that the tire can be quickly and easily removed and replaced without requiring the use of any special tools, all parts of the wheel being constantly accessible to facilitate the work and greatly reduce the labor involved.

Another object is to so construct the wheel that all danger of pulling on the valve stem is eliminated.

A still further object is to provide a wheel which is adjustable to tires of different sizes.

A still further object is to produce a wheel which can be made of any style or design and which is much stronger, safer and more substantial in every way than wheels commonly employed.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawing the preferred form of the invention has been shown.

In said drawing—

Figure 1 is a side elevation of a wheel constructed in accordance with the present invention.

Figure 2 is a section on line 2—2, Figure 1, a tire being shown in position.

Figure 3 is an elevation of a portion of the rim of the wheel and showing the valve stem gripping blocks in position.

Figure 4 is a section on line 4—4, Figure 1, a tire being shown in position.

Figure 5 is a perspective view of the two tire stem gripping blocks.

Referring to the figures by characters of reference I designates the rim of the wheel which can be connected in any suitable manner to the wheel hub 5. For example, and as shown in the drawing, this rim I is formed at the periphery of a disk attached to the hub by means of bolts 4. Obviously instead of utilizing a disk, spokes of any type could be used or any suitable connection other than the one shown might be employed.

Arranged at the sides of the rim I are rings 2 from which are extended flanges II which are spaced apart a sufficient distance to receive between them the bead portions of a tire T. The rings 2 are held in place by transverse bolts 3 extending through rim I and provided with heads 3a and nuts 3b.

At a suitable point in the circumference of the rim I there is formed a recess or pocket 12 in which are seated opposed gripping blocks 6 and 7 each of which has a laterally extended screw-threaded stud 6b or 7b extended through an opening in the adjacent surface of the rings 2 and these studs are engaged by nuts 14 whereby the blocks 6 and 7 are held securely to the rings 2.

The inner faces of the two blocks 6 and 7 are grooved as shown at 6a and 7a respectively so as to form a passage adapted to receive the tube 9 of the valve stem 15. This stem is extended laterally within a groove 6c in one of the blocks 6 and projects through one of the rings 2 where it can be reached conveniently for the purpose of inflating the tire.

For the purpose of varying the thickness of the wheel so as to adapt it to tires of different sizes, spacing rings 10 can be interposed between the rings 2 and the rim I and these rings are secured by the bolts 3 extending through them. The rings are also recessed at proper points so as not to intersect the pocket 12.

When it is desired to remove a tire from the wheel, it is only necessary to use an ordinary wrench for the purpose of removing the nuts 3b. This will release the adjacent ring 2 and its flange II so that the tire can thus be readily removed. When the ring is taken off as explained it will also take off the stem gripping block attached thereto so that the valve stem and its tube will not be distorted during this operation.

When placing the tire on the wheel the foregoing operation is reversed.

Obviously with this construction the operation of placing and removing a tire is greatly simplified and as only the nuts need be loosened and removed for making a change, no special tools other than an ordinary wrench, are necessary. The several parts of the wheel are interchangeable.

What is claimed is:

1. A vehicle wheel including a rim, flanged rings at the sides thereof constituting tire retaining means, said rim and rings having cooperating structures to provide a pocket in the periphery of the wheel, opposed blocks in the pocket and secured to the respective rings, there being grooves in the blocks providing seats for a valve stem extending between the blocks and laterally through one of the rings.

2. A vehicle wheel including a rim, flanged rings at the sides of the rim and constituting means for holding a tire on the rim, means extending through the rings and rim for holding them together, spaced blocks removably seated in the rim and secured to the respective rings, said blocks being grooved to receive between them a valve stem extended laterally through one of the rings.

3. A vehicle wheel including a rim, tire retaining rings at the sides of the rim, there being a pocket within the rim and between the rings, opposed blocks seated in the pocket and secured to the respective rings, said blocks being grooved to receive a valve stem extending between the blocks and laterally through one of the rings, spacing rings between the rim and the tire retaining rings, and means extending through the rim and the rings for holding them together detachably.

COLEMAN DORSEY HOBB.